(12) United States Patent
Yoo et al.

(10) Patent No.: US 7,898,922 B2
(45) Date of Patent: Mar. 1, 2011

(54) OPTICAL PICKUP APPARATUS

(75) Inventors: Jang Hoon Yoo, Seoul (KR); Ichiro Morishita, Yokohamasi (JP); Soo Han Park, Yongin (KR); Do Hoon Nam, Suwon-si (KR); Ho Jin Yoon, Yongin-si (KR); Myoung Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 11/762,918

(22) Filed: Jun. 14, 2007

(65) Prior Publication Data

US 2008/0056102 A1   Mar. 6, 2008

(30) Foreign Application Priority Data

Sep. 1, 2006   (KR) ............. 10-2006-0084409

(51) Int. Cl.
    *G11B 7/00*   (2006.01)
(52) U.S. Cl. ............. 369/100; 369/112.01; 369/112.05; 369/112.24; 369/53.28
(58) Field of Classification Search ............. 369/112.26, 369/112.1, 112.24, 53.1, 44.37, 112.05, 100, 369/53.28, 112.01
    See application file for complete search history.

(56) References Cited

U.S. PATENT DOCUMENTS

| 6,034,935 | A | * | 3/2000 | Kim et al. ............. 369/53.28 |
|---|---|---|---|---|
| 2004/0184376 | A1 | * | 9/2004 | Ishibashi et al. ........... 369/53.1 |
| 2005/0265151 | A1 | * | 12/2005 | Kimura et al. ........... 369/44.37 |
| 2006/0109772 | A1 | * | 5/2006 | Kim ............. 369/112.05 |
| 2006/0164954 | A1 | * | 7/2006 | Hashimura ............. 369/112.01 |
| 2009/0040909 | A1 | * | 2/2009 | Anzai et al. ............. 369/112.24 |

FOREIGN PATENT DOCUMENTS

| CN | 1811940 | 8/2006 |
|---|---|---|
| EP | 1615213 | 1/2006 |
| EP | 1688938 | 8/2006 |

(Continued)

OTHER PUBLICATIONS

Office Action issued Mar. 20, 2009 in Chinese Patent Application No. 200710142157.8.

(Continued)

*Primary Examiner*—Thuy N Pardo
(74) *Attorney, Agent, or Firm*—Stanzione & Kim, LLP

(57) ABSTRACT

An optical pickup apparatus includes a first objective lens having a low numerical aperture (NA) suitable for a low-density recording medium, a second objective lens having a high NA suitable for a high-density recording medium, a first light source to generate a short-wavelength optical signal to use the first and second objective lenses, a first photo-detector to receive an optical signal, which is generated from the first light source, is focused on a recording medium by the first and second objective lenses, and is then reflected from the recording medium, and a beam splitter to perform a division of the optical signal generated from the first light source, to direct some parts of the divided optical signal to the first objective lens, and to direct the other parts of the divided optical signal to the second objective lens.

19 Claims, 3 Drawing Sheets

FOREIGN PATENT DOCUMENTS

| | | |
|---|---|---|
| EP | 1892705 | 2/2008 |
| JP | 04-212731 | 8/1992 |
| JP | 09-212905 | 8/1997 |
| JP | 10-027364 | 1/1998 |
| JP | 2004-295983 | 10/2004 |
| JP | 2006-147075 | 6/2006 |
| JP | 2006-220550 | 8/2006 |
| KR | 100603770 | 7/2006 |
| WO | 2006115161 | 11/2006 |

OTHER PUBLICATIONS

European Search Report issued May 8, 2009 in EP Application No. 07110336.0.

Japanese Search Report dated Dec. 9, 2009 issued in JP Application No. 2007-187467.

* cited by examiner

OPTICAL PICKUP APPARATUS

CROSS-REFERENCE TO RELATED APPLICATIONS

This application claims priority under 35 U.S.C. §119(a) from Korean Patent Application No. 2006-0084409, filed on Sep. 1, 2006 in the Korean Intellectual Property Office, the disclosure of which is incorporated herein in its entirety by reference.

BACKGROUND OF THE INVENTION

1. Field of the Invention

The present general inventive concept relates to an optical pickup apparatus, and more particularly, to an optical pickup apparatus to allow a variety of discs having different recording densities to be compatible with each other.

2. Description of the Related Art

Generally, a conventional apparatus for recording/reproducing data in/from an optical disc (hereinafter referred to as a conventional optical-disc recording/reproducing apparatus), acting as an information storage medium using a light beam (or optical signal) focused by an objective lens, determines its own recording capacity according to a size of a beam spot (S). The size of the beam spot (S) is determined by the following equation 1 according to a wavelength of the light beam $\lambda$ and a Numerical Aperture (NA) of the objective lens:

$$S \propto \lambda/NA \quad \text{[Equation 1]}$$

Therefore, in order to reduce the size of the beam spot focused on the optical disc to implement a high-density optical disc, a short-wavelength light source, such as, a blue-violet laser beam, and an objective lens having an NA of at least 0.6 are needed in the optical-disc recording/reproducing apparatus.

A Digital Versatile Disc (DVD) performs recording/reproducing of data using an optical signal having a wavelength of 650 nm (or 635 nm) and an objective lens having an NA of 0.6. If the DVD has a diameter of 120 mm and a track-pitch of 0.74 μm, a cross-section of the DVD has recording capacity of at least 4.7 GB.

Therefore, the above-mentioned DVD is insufficient as a recording medium capable of recording High Definition-grade (HD-grade) moving image data (or HD-grade motion picture data). In order to record moving image data of about 135 minutes at the HD grade, a cross section of the DVD requires a recording capacity of at least 23 GB.

In order to satisfy the increasing demands of the above-mentioned high-density recording capacity, an optical signal (i.e., a blue optical signal) having a wavelength (e.g., 405 nm~408 nm) shorter than that of a red optical signal and an objective lens having an NA of more than 0.6 have been widely used. Many developers are conducting intensive research into a high-density optical disc having a narrower track (i.e., the next-generation DVD such as a HD-DVD), and the specification of the next-generation DVD is being intensively developed.

In the meantime, in order to guarantee a tolerance caused by a tilting of the optical disc, the thickness of the optical disc must be reduced in inverse proportion to the NA of the objective lens, resulting in the implementation of high-density optical discs. Considering the allowance tolerance caused by the tilting of the optical disc, the DVD has a thickness of 0.6 mm whereas the CD has a thickness of 1.2 mm, and the HD-DVD may have a thickness of 0.6 mm. In the case of the NA of the objective lens, the CD has a NA of 0.45, and each of the DVD and the HD-DVD may have a NA of 0.65. Considering the recording density of the light source of the HD-DVD, the HD-DVD may use a blue optical signal. In this way, an important matter in the development of the above-mentioned new-standard optical disc is the compatibility between the new-standard optical disc, such as the HD-DVD, and a conventional optical disc, such as, the DVD.

Blu-ray Discs (BDs) have also been widely developed as a next-generation high-density optical storage medium using an objective lens having a high NA (e.g., 0.85).

The BD uses a short-wavelength optical signal (i.e., an optical signal of 405 nm-408 nm) as a light source, and may have a thickness of 0.1 mm. The above-mentioned BD has a recording density ten times higher than that of the DVD. In this way, another important matter in the development of the new-standard optical storage medium is the compatibility between a new-standard optical storage medium, such as a BD, and the conventional discs, such as a DVD.

For example, a reflection factor of a write-once optical disc (e.g., DVD-R and CD-R) from among conventional optical discs is considerably decreased according to wavelengths, such that a light beam having a predetermined wavelength of 650 nm and a light beam having a predetermined wavelength of 780 nm are required to solve the problem of reflection-factor deterioration. Therefore, considering a compatibility of the DVD-R and/or the CD-R, each of a HD-DVD optical pickup unit and a BD optical pickup unit is required to use two or three light sources having different wavelengths.

However, high-grade complex techniques are required to design or manufacture an objective lens having a high NA (e.g., 0.85) in the form of a single piece, and it is difficult to manufacture an objective lens which is simultaneously suitable for the HD-DVD and having a high NA, that can also be applied to DVDs and/or CDs, and in addition has a long working distance as in the objective lens for DVDs. Also, the specifications of the new-standard high-density discs (e.g., HD-DVDs and BDs), each of which has a short-wavelength of 405 nm, have not been standardized yet. In order to manufacture an optical pickup unit capable of coping with two discs simultaneously and being compatible with CDs and/or DVDs, a large number of optical components and control units are required, such that the configuration of the optical pickup unit becomes more complicated.

SUMMARY OF THE INVENTION

The present general inventive concept provides an optical pickup apparatus, including a plurality of objective lens, to be compatible with optical discs having different recording densities.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an optical pickup apparatus including a first objective lens having a low numerical aperture (NA) suitable for a low-density recording medium, a second objective lens having a high NA suitable for a high-density recording medium, a first light source to generate a short-wavelength optical signal to use the first and second objective lenses, a plurality of first photo-detectors to receive the optical signal, which is generated from the first light source, is focused on a recording medium by the first and second objective lenses, and is then reflected from the recording medium, and a beam splitter to perform a division of the optical signal generated from the first light source, to direct some parts of the divided optical signal to the first objective lens, and to direct the other parts of the divided optical signal to the second objective lens.

The beam splitter may perform the division of the optical signal according to a polarization component.

The first light source may have a polarization component to simultaneously direct the first and second objective lenses, such that the polarization component of the first light source rotates by a predetermined angle on the basis of an incident surface of the beam splitter.

The apparatus may further include a ½ wavelength plate located between the first light source and the beam splitter, such that the ½ wavelength plate simultaneously directs the optical signal to the first and second objective lenses.

The first objective lens and the second objective lens may reproduce data of at least one disc, respectively.

The beam splitter may include a polarization beam-splitter to perform a reflection or penetration of the optical signal according to a polarization component of an incident light; and a color-breakup beam-splitter to perform a reflection or penetration of the optical signal according to wavelengths of the incident light.

The beam splitter may encounter a leak of some parts of the optical signal according to the polarization component of the incident light, and may include a photo-detector capable of detecting an amount of the leaked light.

The apparatus further may include first and second collimating lenses located at optical paths received in the first and second objective lenses, respectively, such that they convert an incident light into a parallel light.

The plurality of the first photo-detectors may include one first photo-detector.

The apparatus further may include a correction element to correct de-focusing of the first photo-detector receiving the optical signal, which is generated from the first light source, is focused on a recording medium by the first and second objective lenses, and is reflected from the recording medium.

The correction element may be located between the first or second objective lens and the first photo-detector.

The correction element may include a lens or a hologram element.

The correction element may act as a lens according to the polarization component.

The apparatus further may include a monitoring photo-detector to detect a light quantity of an output optical signal of the first light source, to constantly maintain a quantity of light focused on a recording medium by the first and second objective lenses.

The first light source may include a blue laser diode to emit a blue light or blue optical signal.

The apparatus further may include at least one second light source to generate a long-wavelength optical signal having a wavelength longer than that of the first light source, a second photo-detector to receive the optical signal, which is generated from the second light source, is focused on a recording medium by the first objective lens, and is reflected from the recording medium, and a beam splitter to direct the optical signal generated from the second light source to the first objective lens, and to direct the optical signal reflected from the recording medium via the first objective lens to the second photo-detector.

The second light source may include a 2-wavelength laser diode to independently generate an infrared optical signal and a red optical signal, which have different wavelengths.

The apparatus further may include a reflection member located between one of the first and second objective lenses and one of the first and second collimating lenses, respectively, such that it changes an optical path into another optical path.

The apparatus further may include a ½ wavelength plate located between the beam splitter and the reflection member, such that it can constantly maintain the polarization component of the optical signal received in the first and second objective lenses, and can also maintain coating characteristics of the reflection member.

The foregoing and/or other aspects and utilities of the present general inventive concept may also be achieved by providing an optical pickup apparatus including a first objective lens having a low numerical aperture (NA) suitable for a low-density recording medium, a second objective lens having a high NA suitable for a high-density recording medium, a first light source to generate a short-wavelength optical signal for the first and second objective lenses, a first photo-detector to receive the optical signal, which is generated from the first light source, is focused on a recording medium by the first and second objective lenses, and is reflected from the recording medium, a beam splitter to perform a division of the optical signal generated from the first light source, to direct some parts of the divided optical signal to the first objective lens, and to direct the other parts of the divided optical signal to the second objective lens, and a decision unit for determining a type of the recording medium, selecting any one of the first and second objective lenses according to the determined type of the recording medium, and detecting a playback signal using the selected objective lens.

The decision unit may determine the type of the recording medium using a focus-error signal received from the first photo-detector or the magnitude of a light quantity of a sum signal.

The foregoing and/or other aspects and utilities of the present general inventive concept may be achieved by providing an optical pickup apparatus, including a first objective lens having a first numerical aperture to record and reproduce data from a first type of optical disk, a second objective lens having a second numerical aperture to record and reproduce data from a second type of optical disk, a first light source to generate a short wavelength optical signal provided to the first and second objective lenses, a first photo-detector to receive the optical signal and to detect an information signal and an error signal, and a beam splitter to divide the optical signal and direct portions of the optical signal to the first and second objective lenses, respectively.

The apparatus may further include at least two collimating lenses to correct a spherical aberration caused by a difference in thickness of the types of optical disks.

The apparatus may further include a second light source to generate an optical signal having a wavelength greater than the optical signal generated by the first light source, provided to the first objective lens to record and reproduce data from a third type of optical disk, and a second photo detector to receive the optical signal and to detect an information signal and an error signal associated with the third type of optical disk, wherein the beam splitter directs the optical signal generated from the second light source to the first objective lens, and directs the optical signal reflected from the recording medium via the first objective lens to the second photo-detector.

The first type of optical disk may be an HD-DVD.

The second type of optical disk may be an HD-DVD.

The third type of optical disk may be a DVD or a CD.

The apparatus may further include a correction element to correct a de-focusing produced when switching between the first and second type of optical disks.

The apparatus may further include a decision unit to determine the type of disc seated in the optical pickup apparatus, to select an objective lens suitable for the seated disk, and to detect a playback signal.

The foregoing and/or other aspects and utilities of the present general inventive concept may be achieved by providing an optical pickup apparatus, including a first objective lens having a first NA compatible with a BD, a second objective lens having a second NA compatible with an HD-DVD, and a first light source comprising a single blue laser diode to generate an optical signal provided to the first and second objective lenses.

The optical pickup apparatus may control the optical signal of the first light source to be simultaneously received in the first and second objective lenses using a beam splitter.

The apparatus may not require an additional power-supply unit to employ the second objective lens.

The beam splitter may include a polarization beam-splitter and a color-breakup beam-splitter as a single unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
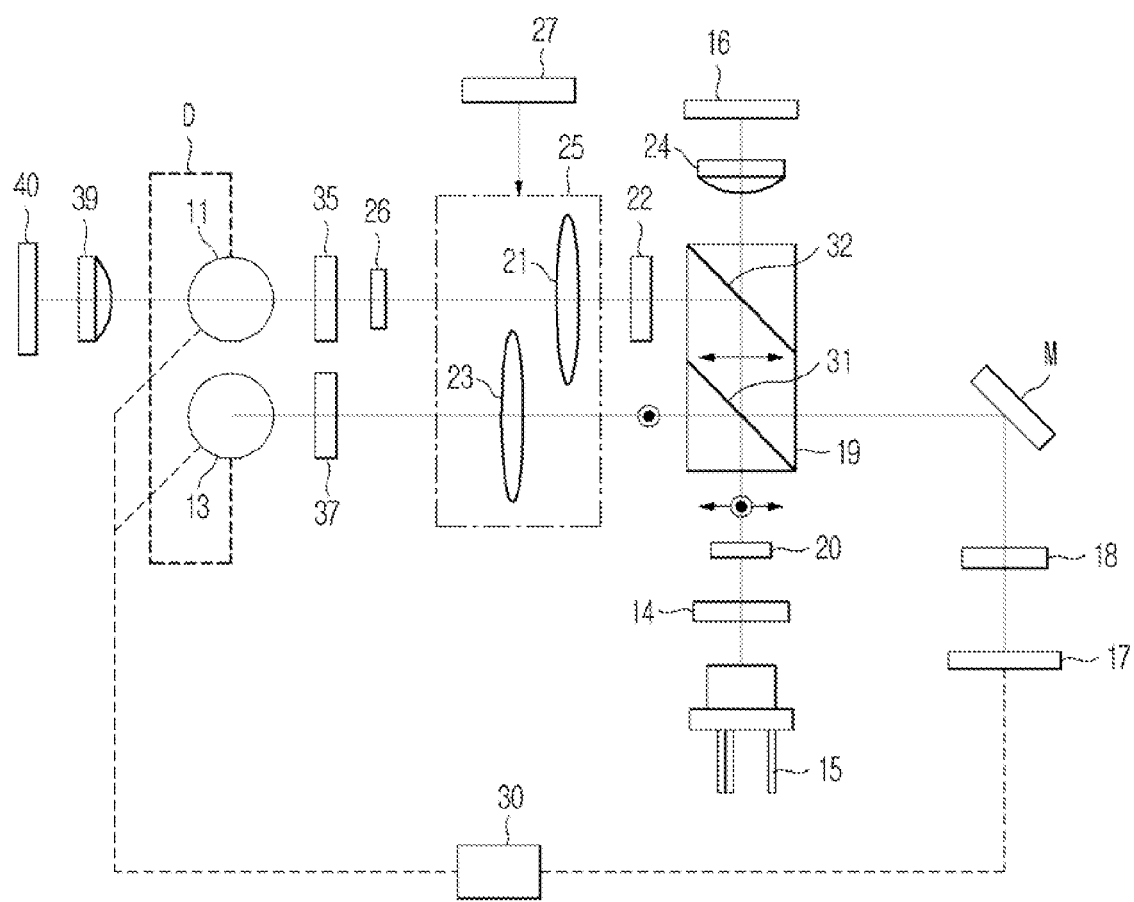
FIG. 1 is a schematic diagram illustrating an optical pickup apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

An optical pickup unit and an apparatus to record/reproduce data in/from an optical disc will hereinafter be described with reference to the attached drawings.

FIG. 1 is a schematic diagram illustrating an optical pickup apparatus according to an embodiment of the present general inventive concept. The optical pickup apparatus maybe used in a disc recording and/or reproducing system, such as a DVD player, a disc player, and the like.

Referring to FIG. 1, the optical pickup apparatus can allow several optical discs having different thicknesses to be compatible with each other. The optical pickup apparatus may include a first objective lens 11 to record/reproduce data in/from at least one low-density optical disc, a second objective lens 13 to record/reproduce data in/from a high-density optical disc, a first light source 15, a first photo-detector 17, and a beam splitter 19.

For example, the first objective lens 11 can record/reproduce data in/from a DVD-based optical disc (hereinafter referred to as a DVD) acting as a low-density optical disc, and can also record/reproduce data in/from a CD-based optical disc (hereinafter referred to as a CD). The first objective lens 11 may also be designed to record/reproduce data in/from a HD-DVD based optical disc (hereinafter referred to as a HD-DVD) having density higher than that of the DVD. In this way, the first objective lens 11 can be designed to have an NA of equal or less than 0.65 to record/reproduce data in/from different optical discs (e.g., CDs, DVDs, and HD-DVDs), such that it can be used with optical discs having a thickness of at least about 0.6 mm.

In this case, in order to correct spherical aberration required to record/reproduce data in/from three or more optical discs having different recording densities, a first collimating lens 21 can be located at an optical path applied to the first objective lens 11. The first collimating lens 21 converts an input optical signal of the first objective lens 11 into a parallel optical signal, such that it can correct the spherical aberration caused by optical discs having different thicknesses. The first collimating lens 21 can be installed at the optical path such that it can simultaneously move together with a second collimating lens 23 described below.

The second objective lens 13 may have an NA of at least 0.85, such that data can be easily recorded/reproduced in/from a high-density optical disc (e.g., a BD-based optical disc, hereinafter referred to as a BD, having a thickness of 0.1 mm) having a recording density higher than that of the discs supported by the first objective lens 11. The second objective lens 13 can be supported by a blade (not illustrated) along with the first objective lens 11, such that it can be operated in a track- or focusing-direction by an actuator (not illustrated). The second collimating lens 23 to correct the spherical aberration of the second objective lens 13 for a thin optical disc, such as a BD, is installed at the optical path applied to the second objective lens 13. The second collimating lens 23 can be attached to a holder 25 along with the first collimating lens 21. The holder 25 can be controlled to reciprocate in the traveling direction of an optical signal by a drive equipped with a stepping motor 27. In this way, the holder 25 can simultaneously drive two collimating lenses 21 and 23, resulting in the reduction of the number of electronic components and the reduction of an installation space. Alternatively, the first collimating lens 21 can be fixed at an optical path, and the second collimating lens 23 can be movable along the optical path, as it is known that the spherical aberration can be corrected by moving only one lens from among two collimating lenses 21 and 23. Reference letter D in FIG. 1 illustrates a position of an optical disc, which can be, for example, either a BD or a HD-DVD.

The first light source 15 may be implemented with a blue laser diode capable of generating a blue optical signal having a short wavelength of 405 nm~408 nm (preferably 405 nm). The blue optical signal generated from the first light source 15 can be adapted to record/reproduce data in/from the HD-DVD using the first objective lens 11. The blue optical signal can also be adapted to record/reproduce data in/from the high-density optical disc, such as the BD.

The first photo-detector 17 may be a photo-diode IC (Integrated Circuit) capable of detecting an information signal and an error signal upon receipt of all the optical signals reflected from the HD-DVD or BD. Only one first photo-detector 17 may be used for the optical pickup apparatus according to the present general inventive concept, such that it can be commonly used for both the HD-DVD and the BD.

A servo-detecting lens 18 to magnify the spot of beam received in the first photo-detector 17 can be located at one side of the first photo-detector 17. The beam can be directed from the beam splitter 19 to the servo-detecting lens 18 by a mirror M.

For example, if a HD-DVD is seated in the optical pickup apparatus according to the present general inventive concept, the optical signal of the first light source 15 is received in the first objective lens 11, is then reflected from the HD-DVD, and is then received in the first photo-detector 17. If the BD is seated in the optical pickup apparatus, the optical signal of the first light source 15 is received in the second objective lens 13, is reflected from the BD, and is received in the first photo-detector 17. The first photo-detector 17 is commonly used for both the HD-DVD and the BD, such that a relative de-focusing may occur. In other words, an unexpected spherical aberration may occur in the BD. Provided that a playback signal is reflected from the HD-DVD after the first photo-detector 17 is optimized for the BD, and is then detected by the first photo-detector 17, the de-focusing occurs. Due to the above-mentioned de-focusing, the objective lens may not maintain the distance from the disc at an optimum focusing location.

Therefore, a correction element 22 can be adapted to correct the above-mentioned de-focusing. The correction element 22 may be located between the first or second objective lens 11 or 13 and the first photo-detector 17. The correction element 22 can be located between the first collimating lens 21 and a color-breakup beam splitter 32.

The above-mentioned correction element 22 may be implemented with a lens or hologram element, and may act as a lens according to a polarization component.

The beam splitter 19 can be located between the first light source 15 and the optical path arranged between the first objective lens 21 and the second objective lens 23. The beam splitter 19 may include a polarization beam-splitter 31 and the color-breakup beam splitter 32. The polarization beam-splitter 31 performs reflection or penetration of an incident light. The color-breakup beam splitter 32 can be located between the polarization beam-splitter 31 and the first objective lens 11, such that it performs reflection or penetration of some parts of the incident light.

The polarization component generated from the first light source 15 has a predetermined angle of about 30°~50° on the basis of an incident surface of the polarization beam-splitter 31, and some optical signals are penetrated and the remaining parts are reflected, such that they simultaneously go to the first and second collimating lenses 21 and 23. The optical signals are focused on the disc by the two objective lenses 11 and 13. In other words, some optical signals are reflected from the polarization beam-splitter 31 according to the polarization component of the incident light, such that the reflected optical signals are applied to the second objective lens 13. The remaining optical signals pass the beam splitter 31, and are applied to the first objective lens 11 via the color-breakup beam-splitter 32, such that the resultant optical signal are simultaneously applied to two optical paths to connect the first and second objective lenses 11 and 13 to the beam splitter 19.

As described above, in order to simultaneously direct the optical signal to the first and second objective lenses 11 and 13, the polarization component of the optical signal generated from the first light source 15 can have a predetermined angle of about 30°~50° on the basis of an incident surface of the polarization beam-splitter 31. For this purpose, the first light source 15 can rotates by about 30°~50°, or a ½ wavelength plate 20 can be arranged between the first light source 15 and the beam splitter 19. The ½ wavelength plate 20 converts the polarization component of the optical signal in a range from the first light source 15 to the polarization beam-splitter 31 into other components.

The color-breakup beam splitter 32 has wavelength-dependent characteristics to perform a reflection or penetration of the light (or optical signal) according to a wavelength of the incident light. The polarization beam-splitter 31 and the color-breakup beam splitter may be integrated in a single unit.

In order to constantly maintain an amount of light focused on a recording medium via the first and second objective lenses 11 and 13, the optical pickup apparatus may include first and second monitoring photo-detectors 16 and 40 capable of monitoring optical output values of the first light source 15. The first and second monitoring photo-detectors 16 and 40 receive some parts of the optical signal generated from the first light source 15, measure a power of the received optical signal, and acquire information to control the output values of the first light source 15.

Because a variety of optical electronic components have different coatings according to wavelengths of the incident light, and there is a difference in light quantity according to the location of the monitoring photo-detector, the optical pickup apparatus may not correctly detect the optical signal using only one monitoring photo-detector. Particularly, the optical pickup apparatus, capable of employing several optical discs having different recording densities, may include the first and second monitoring photo-detectors 16 and 40 to correctly detect the optical signal. The first monitoring photo-detector 16 can arranged to face the first light source 15, and receives some parts of an optical signal passing through the beam splitter 19. The second monitoring photo-detector 40 can be arranged at a specific location of an optical path at which the first objective lens 11 is located. In this case, the second monitoring photo-detector 40 may be used when the HD-DVD or the BD is inserted into the optical pickup apparatus, and the first monitoring photo-detector 16 may be used when the DVD or the CD is inserted into the optical pickup apparatus.

The second monitoring photo-detector 40 may be located at the optical path at which the first objective lens 15 is located. However, it should be noted that the second monitoring photo-detector 40 controls the optical signals received via two optical paths to be focused on a single lens, such that the focused optical signal can also be detected by a single photo-detector.

First and second photo-detection lenses 24 and 39 can be located at the optical paths received in the first and second monitoring photo-detectors 16 and 40, respectively.

The optical pickup apparatus according to the present general inventive concept may include a decision unit 30 including a detection algorithm to determine the disc type when a disc is changed to another disc, to select objective lenses 11 and 13 suitable for the changed disc, and to detect a playback signal. For example, if the BD is seated in the optical pickup device, the optical pickup device detects a servo-signal from the second objective lens 13 suitable for a disc having a thickness of 0.1 mm. The servo-signal acquired from the first objective lens 11 cannot sufficiently acquire the light quantity due to the high spherical aberration. In this case, in order to increase the accuracy of the servo-signal detection, the decision unit 30 determines the disc type using the focus-error signal received from the first photo-detector 17 or the magnitude of the light quantity of the sum signal (sum). If the HD-DVD is seated, the servo-signal is detected from the first objective lens 11 because the HD-DVD has a thickness of 0.6 mm, such that data of the HD-DVD can be reproduced. In this case, if the decision of disc types is completed by the objective lenses 11 and 13, a shutter (not illustrated) may be installed at the optical path to maximally reduce the noise reflected from the disc.

A grating element 14 can be arranged between the first light source 14 and the beam splitter. The grating element 14 is required for a precise servo-control operation in focusing- or track-directions of the objective lenses 11 and 13, and is known to those skilled in the art, such that its detailed description will herein be omitted for the convenience of description.

First and second ¼ wavelength plates 35 and 37 can be located at first ends of the first and second objective lenses 11 and 13, respectively. The first ¼ wavelength plate 35 changes the polarization component of an optical signal, which is focused by the first objective lens 11 and is then reflected from the disc to another component. The second ¼ wavelength plate 37 changes the polarization component of an optical signal, which is focused by the second objective lens 13 and is then reflected from the disc to another component.

The first ¼ wavelength plate 35 converts a P-wave polarization signal to be received in the first objective lens 11 via the color-breakup beam-splitter 32, into a first circular-wave optical signal (i.e., right-side signal). The first circular-wave optical signal is reflected from the low-density optical disc, and is changed to a second circular-wave optical signal (i.e., left-side signal). The second circular-wave optical signal is changed to an S-wave polarization signal by the first ¼ wavelength plate 35. Therefore, the P-wave polarization signal received in the first objective lens 11 via the beam splitter 19 is converted into the S-wave polarization signal when it is reflected from the optical disc, and is then reflected from the polarization beam-splitter 31, such that it can be received in the first photo-detector 17.

The second ¼ wavelength plate 37 converts the S-wave polarization signal to be received in the second objective lens 13 via the polar beam-splitter 31, into the first circular-wave optical signal. The first circular-wave optical signal is reflected from the high-density optical disc, and is changed to the second circular-wave optical signal. The second circular-wave optical signal is changed to the P-wave polarization signal by the second ¼ wavelength plate 37. Therefore, the S-wave polarization signal received in the second objective lens 13 via the polarization beam-splitter 31 is converted into the P-wave polarization signal when it is reflected from the optical disc, and passes through the polarization beam-splitter 31, such that it can be received in the first photo-detector 17.

Figure 3:
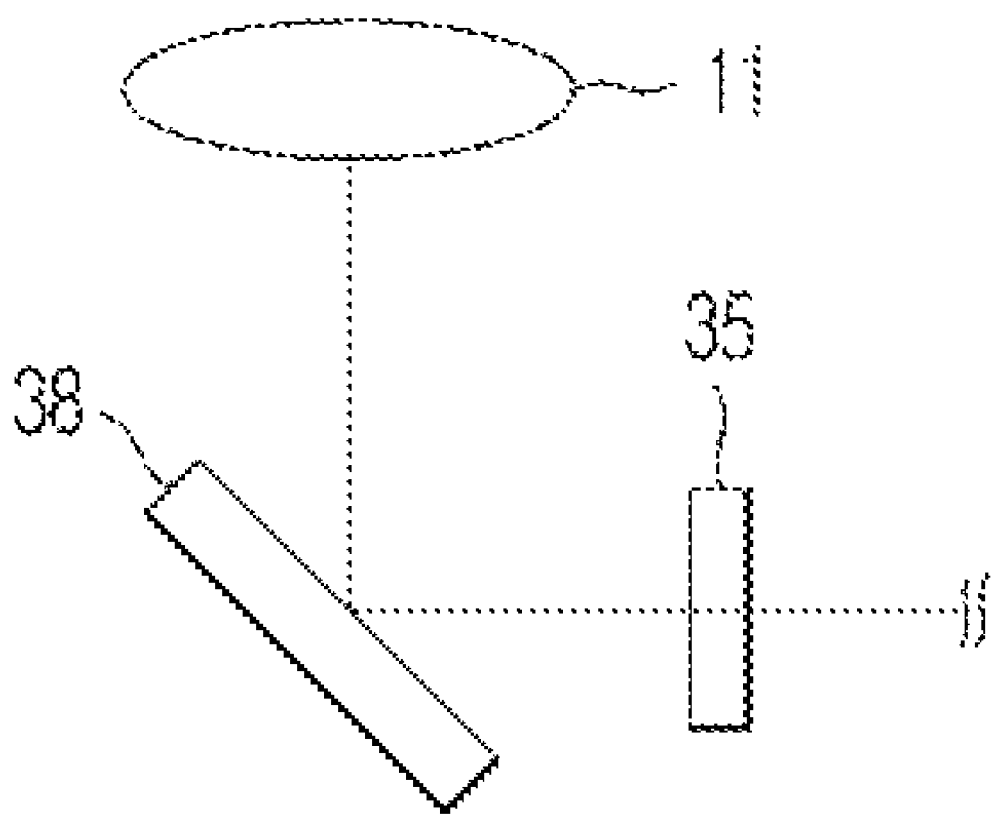
FIG. 3 is a schematic diagram illustrating a position of a reflection member contained in the optical pickup apparatus of FIG. 1.

As illustrated in FIG. 3, a reflection member 38 can be arranged between one of the first and second objective lenses 11 and 13 and one of the first and second ¼ wavelength plates 35 and 37, respectively, such that it can change an optical path of an incident light received from the first light source 15. The reflection member 38 may be assigned for each optical path, however, it is assumed that a single reflection member 38 is located at not only an optical path between the first objective lens 11 and the first ¼ wavelength plate 35, but also another optical path between the second objective lens 13 and the second ¼ wavelength plate 37.

If a single reflection member 38 is arranged at several optical paths, it must have different coating characteristics according to individual polarization components, because different polarization components are received in the first and second objective lenses 11 and 13 via the first and second ¼ wavelength plates 35 and 37.

In order to constantly maintain the polarization components of the optical signals received in the first and second objective lenses 11 and 13 simultaneously while constantly maintaining the coating characteristics of the reflection member 38 located between the first/second ¼ wavelength plates 35 and 37 and the first/second objective lenses 11 and 13, an additional ½ wavelength plate 26 can be arranged at any one of several optical paths between the beam splitter 19 and the reflection member 38. The ½ wavelength plate 26 can be located at the optical path between the color-breakup beam-splitter 32 and the first objective lens 11, such that it can constantly maintain the polarization components of the optical signal received in the reflection member 38. In this case, the reflection member 38 including the different coating characteristics can be easily implemented, and the production yield of a manufactured product can also be improved.

As described above, the optical pickup device according to the present general inventive concept can allow the HD-DVD and the BD to be compatible with each other using two objective lenses 11 and 13 having different NAs and the first light source 15 composed of a single blue laser diode.

Figure 2:
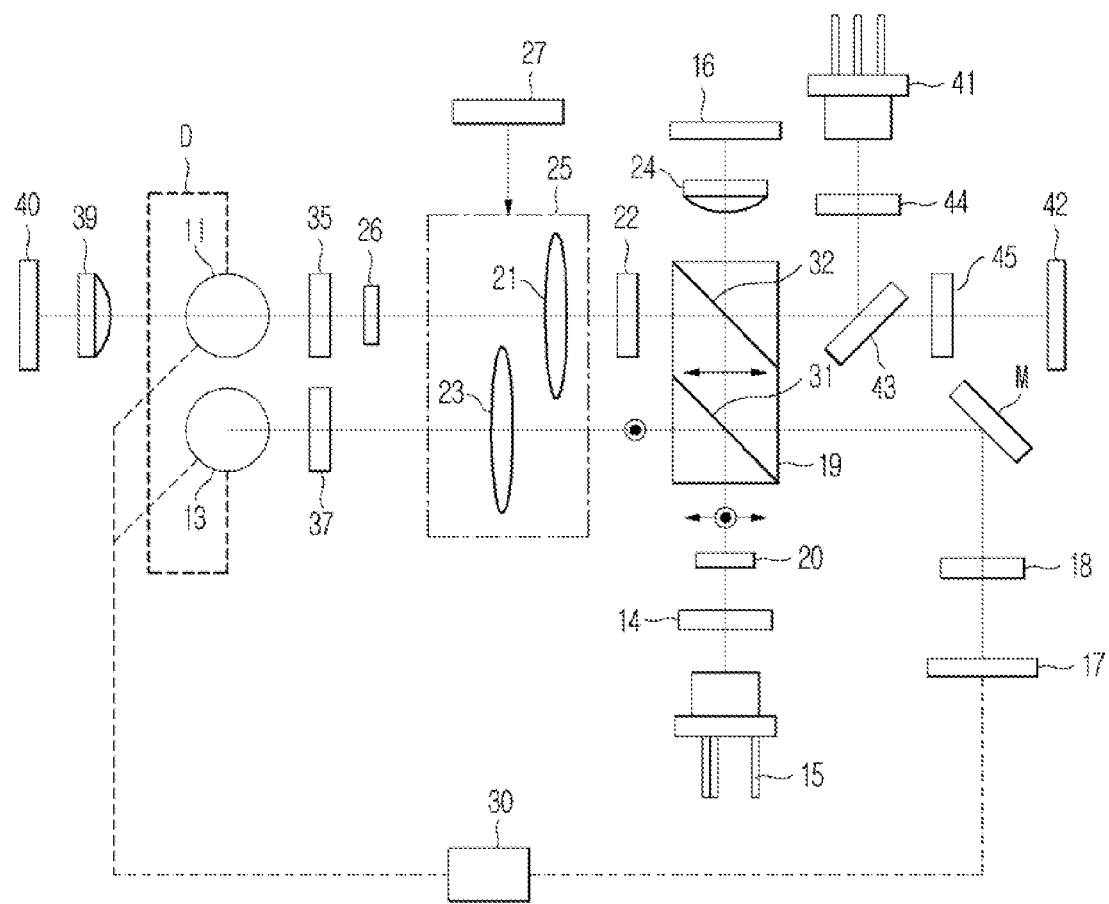
FIG. 2 is a schematic diagram illustrating a second light source contained in the optical pickup apparatus of FIG. 1.

As shown in FIG. 2, the optical pickup device according to the present general inventive concept may further include a second light source 41 and an optical-path converter 43, such that it can record/reproduce data in/from the low-density optical disc such as CD or DVD using the first objective lens 11. In this case, the second light source 41 may be implemented with a second wavelength laser diode.

The second light source 41 may include a first laser diode to emit an infrared optical signal having a wavelength of at least 730 mm, and a second laser diode to emit a red optical signal having a wavelength of 600 nm~730 nm. The first laser diode may have a wavelength of about 780 nm, and a second laser diode may have a wavelength of about 650 nm. In this case, the second light source can be configured in the form of a module including both laser diodes and a photo-detector.

The optical-path converter 43 can be implemented with a plate-type polarization beam-splitter, such that it transmits long-wavelength optical signals generated from the second light source 41 including a 2-wavelength laser diode to the first objective lens 11 and transmits the reflected optical signals to the second photo-detector 42. In this case, the polarization signal generated from the second light source 43 is reflected from the optical disc, and is converted into another polarization component by the first ¼ wavelength plate 35, such that it may go to the second photo-detector 42 via the beam splitter 43. Needless to say, the color-breakup beam splitter 43 can be installed at a long-wavelength optical path, however, it does not depend on the polarization, such that it penetrates most of long-wavelength signals. Some long-wavelength optical signals are reflected from the color-breakup beam splitter 32, and are received in the first monitoring photo-detector 16. Therefore, the first monitoring photo-detector 16 can also control the optical output functions of the second light source 41 composed of the 2-wavelength laser diode.

The second photo-detector 42 may be implemented with a PDIC capable of controlling the CD and the DVD to be compatible with each other.

The reference number 44 of FIG. 2 indicates a grating element 44. The reference number 45 indicates a servo-detection lens 45 to magnify the beam spot received in the second photo-detector 42.

Therefore, the first objective lens 11 or the second objective lens 13 according to the present general inventive concept can reproduce data of at least one disc, respectively. The first objective lens 11 having a low NA controls the HD-DVD and the DVD to be compatible with each other. The second objective lens 13 having a high NA implements the compatibility of BDs. The second objective lens 13 can also control the BD and the HD-DVD to be compatible with each other, and the first objective lens 11 can control the BD-DVD, the DVD, and the CD to be compatible with each other.

As is apparent from the above description, the optical pickup apparatus according to the present general inventive concept controls the optical signals of the first light source to be simultaneously received in the first and second objective lenses using a beam splitter, such that it does not required an additional power-supply unit to employ a plurality of objective lenses, resulting in a reduction of production costs. And, the optical pickup device can also use the BD and the HD-DVD in common.

The optical pickup apparatus can simplify its configuration because it may use only one photo-detector.

The optical pickup apparatus additionally may include a ½ wavelength plate at any one of optical paths between the beam splitter and the reflection member, such that the reflection member can be easily manufactured, resulting in the reduction of production costs.

The optical pickup apparatus integrates the polarization beam-splitter and the color-breakup beam-splitter in a single unit, such that it can use the BD and the HD-DVD in common.

The optical pickup apparatus controls several components to be compatible with each other, resulting in the reduction of the number of components. Therefore, a light-weight and small-sized optical pickup device can be implemented.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. An optical pickup apparatus comprising:
    a first objective lens having a low numerical aperture (NA) suitable for a low-density recording medium;
    a second objective lens having a high NA suitable for a high-density recording medium;
    a first light source to generate a short-wavelength optical signal to use the first and second objective lenses;
    a plurality of first photo-detectors to receive the optical signal, which is generated from the first light source, the optical signal being focused on a recording medium by the first and second objective lenses and reflected from the recording medium;
    a beam splitter to perform a division of the optical signal generated from the first light source, to direct some parts of the divided optical signal to the first objective lens, and to direct the other parts of the divided optical signal to the second objective lens;
    a plurality of collimating lenses disposed in optical paths between the beam splitter and the first and second objective lenses to correct spherical aberrations of the objective lenses;
    a holder to hold the plurality of collimating lenses so that the holder can simultaneously drive the plurality of collimating lenses; and
    a drive connected to the holder to move the holder.

2. The apparatus according to claim 1, wherein the beam splitter performs the division of the optical signal according to a polarization component.

3. The apparatus according to claim 1, wherein the first light source has a polarization component to simultaneously direct the first and second objective lenses, such that the polarization component of the first light source rotates by a predetermined angle on the basis of an incident surface of the beam splitter.

4. The apparatus according to claim 1, further comprising:
    a ½ wavelength plate located between the first light source and the beam splitter, such that the ½ wavelength plate simultaneously directs the optical signal to the first and second objective lenses.

5. The apparatus according to claim 1, wherein the first objective lens and the second objective lens reproduce data of at least one disc, respectively.

6. The apparatus according to claim 1, wherein the beam splitter includes:
    a polarization beam-splitter to perform a reflection or penetration of the optical signal according to a polarization component of an incident light; and
    a color-breakup beam-splitter to perform a reflection or penetration of the optical signal according to wavelengths of the incident light.

7. The apparatus according to claim 6, wherein the beam splitter encounters a leak of some parts of the optical signal according to the polarization component of the incident light, and includes a photo-detector capable of detecting an amount of the leaked light.

8. The apparatus according to claim 1, further comprising:
    first and second collimating lenses located at optical paths received in the first and second objective lenses, respectively, such that the lenses convert an incident light into a parallel light.

9. The apparatus according to claim 1, wherein the plurality of the first photo-detectors comprises one first photo-detector.

10. The apparatus according to claim 9, further comprising:
    a correction element to correct de-focusing of the first photo-detector receiving the optical signal, which is generated from the first light source, is focused on a recording medium by the first and second objective lenses, and is reflected from the recording medium.

11. The apparatus according to claim 10, wherein the correction element is located between the first or second objective lens and the first photo-detector.

12. The apparatus according to claim 10, wherein the correction element comprises a lens or a hologram element.

13. The apparatus according to claim 10, wherein the correction element acts as a lens according to the polarization component.

14. The apparatus according to claim 1, further comprising:
    a monitoring photo-detector to detect a light quantity of an output optical signal of the first light source, to constantly maintain a quantity of light focused on a recording medium by the first and second objective lenses.

15. The apparatus according to claim 1, wherein the first light source includes a blue laser diode to emit a blue light or blue optical signal.

16. The apparatus according to claim 1, further comprising:
    at least one second light source to generate along-wavelength optical signal having a wavelength longer than that of the first light source;
    a second photo-detector to receive the optical signal, which is generated from the second light source, is focused on a recording medium by the first objective lens, and is reflected from the recording medium; and
    a beam splitter to direct the optical signal generated from the second light source to the first objective lens, and to direct the optical signal reflected from the recording medium via the first objective lens to the second photo-detector.

17. The apparatus according to claim 16, wherein the second light source comprises a 2-wavelength laser diode to independently generate an infrared optical signal and a red optical signal, which have different wavelengths.

18. The apparatus according to claim 8, further comprising:
a reflection member located between one of the first and second objective lenses and one of the first and second collimating lenses, respectively, such that it changes an optical path into another optical path.

19. The apparatus according to claim 18, further comprising:
a ½ wavelength plate located between the beam splitter and the reflection member, such that it can constantly maintain the polarization component of the optical signal received in the first and second objective lenses, and can also maintain coating characteristics of the reflection member.

* * * * *